(12) United States Patent
Oerting et al.

(10) Patent No.: US 7,644,287 B2
(45) Date of Patent: Jan. 5, 2010

(54) PORTION-LEVEL IN-MEMORY MODULE AUTHENTICATION

(75) Inventors: Timothy J. Oerting, Seattle, WA (US); Philip J. Lafornara, Bellevue, WA (US); Robert Ian Oliver, Issaquah, WA (US); Scott A. Brender, Kirkland, WA (US); Michael David Marr, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 890 days.

(21) Appl. No.: 10/902,244

(22) Filed: Jul. 29, 2004

(65) Prior Publication Data

US 2006/0026569 A1 Feb. 2, 2006

(51) Int. Cl.
*G06F 11/30* (2006.01)
(52) U.S. Cl. .................. 713/187; 713/165; 713/168; 711/216; 726/24; 717/126
(58) Field of Classification Search ................. 713/191, 713/187, 188; 717/126, 173, 178, 169, 172, 717/175, 177; 711/216
See application file for complete search history.

(56) References Cited

U.S. PATENT DOCUMENTS 5,339,430 A 8/1994 Lundin et al.

(Continued)

OTHER PUBLICATIONS

Catuogno, L. et al., "A *Format-Independent* Architecture for Run-time Integrity Checking of Executable Code", *Dipartimento di Infromatica ed Applicazioni, Universita di Salerno, Baronissi (SA ) Italy, third Conference on Security in Communication Networks*, Sep. 12-13, 2002, 16 pages.

(Continued)

*Primary Examiner*—Kimyen Vu
*Assistant Examiner*—April Y Shan
(74) *Attorney, Agent, or Firm*—Woodcock Washburn LLP (57) ABSTRACT

Dynamic run-time verification of a module which is loaded in memory (in whole or in part) for execution is enabled by using pre-computed portion-level verification data for portions of the module smaller than the whole (e.g. at the page-level). A portion of the module as loaded into memory for execution can be verified. Pre-computed portion-level verification data is retrieved from storage and used to verify the loaded portions of the executable. Verification data may be, for example, a digitally signed hash of the portion. Where the operating system loader has modified the portion for execution, the modifications are reversed, removing any changes performed by the operating system. If the portion has not been tampered, this will return the portion to its original pre-loaded state. This version is then used to determine validity using the pre-computed portion-level verification. Additionally, during execution of the module, new portions/pages of the module which are loaded can be verified to ensure that they have not been changed, and a list of hot pages of the module can be made, including pages to be continually reverified, in order to ensure that no malicious changes have been made in the module.

24 Claims, 4 Drawing Sheets

U.S. PATENT DOCUMENTS

| | | |
|---|---|---|
| 5,530,757 A | 6/1996 | Krawczyk |
| 5,625,693 A | 4/1997 | Rohatgi et al. |
| 5,757,914 A | 5/1998 | McManis |
| 5,768,382 A | 6/1998 | Schneier et al. |
| 5,907,619 A | 5/1999 | Davis |
| 5,944,821 A | 8/1999 | Angelo |
| 5,970,143 A | 10/1999 | Schneier et al. |
| 6,105,137 A * | 8/2000 | Graunke et al. ............... 726/24 |
| 6,484,315 B1 | 11/2002 | Ziese |
| 6,546,487 B1 | 4/2003 | McManis |
| 6,560,776 B1 | 5/2003 | Breggin et al. |
| 6,681,329 B1 | 1/2004 | Fetkovich et al. |
| 6,854,645 B1 | 2/2005 | Somers et al. |
| 6,961,852 B2 * | 11/2005 | Craft ........................ 713/168 |
| 7,103,779 B2 | 9/2006 | Kiehtreiber et al. |
| 7,197,545 B1 | 3/2007 | Davie |
| 7,325,126 B2 * | 1/2008 | Ivanov et al. ............... 713/100 |
| 7,356,815 B2 | 4/2008 | Sarfati et al. |
| 7,412,480 B2 | 8/2008 | Baentsch et al. |
| 2002/0194484 A1 | 12/2002 | Bolosky et al. |
| 2003/0172370 A1* | 9/2003 | Satuloori et al. ............ 717/120 |
| 2004/0243807 A1 | 12/2004 | Hughes et al. |
| 2005/0010767 A1* | 1/2005 | Craft ........................ 713/168 |
| 2005/0188214 A1* | 8/2005 | Worley et al. ............... 713/187 |
| 2005/0198517 A1* | 9/2005 | Ivanov et al. ............... 713/187 |

OTHER PUBLICATIONS

Impson, J., "Modular Authentication for Linux", *Network Computing,* 2002, 13(5), 92-97.

Ko, C. et al., "Detecting and Countering System Intrusions Using Software Wrappers", *Proceedings of the 9th USENIX Security Symposium,* Aug. 14-17, 2000, Denver Colorado.

Lee, C.H. et al., "A Novel Application of the Phone Card and its Authentication in Mobile Communications", *Journal of Information Science and Engineering,* 1999, 15(4), 471-484.

Ross, M. et al., "ClearTrust takes the Upper Hand in Web-Based Authentication", *Network Computing,* 2000, 11(11), 58.

In the United States Patent and Trademark Office, Non-Final Office Action in re:. Application No. 10/795,068, filed Mar. 5, 2004, Dated Sep. 17, 2008, 31 pages.

In the United States Patent and Trademark Office, Final Office Action in re:. Application No. 10/795,068, filed Mar. 5, 2004, Dated Jan. 11, 2008, 20 pages.

In the United States Patent and Trademark Office, Non-Final Office Action in re:. Application No. 10/795,068, filed Mar. 5, 2004, Dated Apr. 18, 2007, 19 pages.

In the United States Patent and Trademark Office, Final Office Action in re: Application No. 10/795,068, filed Mar. 5, 2004, Dated Jul. 29, 2009.

* cited by examiner

PORTION-LEVEL IN-MEMORY MODULE AUTHENTICATION

CROSS REFERENCE TO RELATED PATENT APPLICATIONS

This application is related to the following previously-filed application: "Portion-Level In-Memory Module Authentication" Ser. No. 10/795,068, filed Mar. 5, 2004.

FIELD OF THE INVENTION

The present invention relates generally to the field of computing, and, more particularly, to the authentication of a software module.

BACKGROUND OF THE INVENTION

Generally, computer applications run by executing code. The code controls the actions of the computer systems on which it is run. In order to protect the application from unauthorized tampering with the code, a number of security precautions may be utilized.

Some of these security measures are physical. For example, a user purchasing software on a CD-ROM may be able to verify that the CD-ROM is a legitimate copy of the software by inspecting holograms or other security devices on the packaging.

Module authentication is a security measure that executes on a computer system and attempts to ensure the security of software applications by providing a level of protection against tampering.

Static module authentication is a mechanism to detect tampering of the portable executable binary modules that comprise a software application. These binary modules are stored on the persistent storage device, which is usually a file on a hard disk and therefore often referred to as the "on-disk" image of the module. Authentication of the on-disk image may be accomplished by cryptographically hashing the file and comparing the result to a precomputed hash of the file. A cryptographic hashing algorithm operates on binary data of arbitrary size and generates a fixed size value known as a hash. Cryptographic hashes are computed such that any modification of the hashed data will cause a change in the generated hash. A hash is computed of the on-disk module. It is almost completely impossible to make a modification of a file to insert malicious changes and yet maintain the same hash of the modified file. Therefore, the hash of a file can be compared to a stored hash in order to verify that no modifications have been made. In order to prevent an adversary from changing the stored precomputed hash as well as the module being validated, the validity of the stored hash must be verifiable. For example, the stored hash may be cryptographically signed by a trusted signatory.

However, in order to be executed, a file constituting the portable executable (PE) computer program module (e.g. a DLL or EXE) must be loaded into memory. Once loaded, this "in-memory" module image is subject to potentially malicious modifications such as code patching, detouring and software debugger breakpoints. Consequently, it is necessary to authenticate the in-memory image of the module as well as the on-disk image. Authentication of this in-memory executable image of the file is known as "in-memory authentication" or "dynamic module authentication".

Since tampering of the in-memory images of application modules can occur at any time during the life of the application session, it is usually desirable from a security standpoint to repeat the in-memory authentication process multiple times.

There are two significant reasons why computing a file hash is not an efficient basis for repeated verification of the in-memory module image. First, working set optimizations may be performed by the operating system or by the program itself which cause not all of an executable to be loaded into memory at any given time. This is done to reduce the memory footprint of the running process, for example, so that many processes can run on a computer with limited memory and not cause page swapping. It also minimizes the use of memory bus and device I/O bandwidth (for example, to the hard disk where the executable image is stored) consumed by subsequent page swapping. Memory and bandwidth are valuable fixed resources dictated by the hardware configuration of the computer, so a reduction in the use of either improves the behavior of the computer on all running applications. However, each time a whole file hash must be computed, the entire file must be loaded into physical memory. This negates the benefit of any working set optimizations performed by the operating system or the program itself because the entire module image must be loaded from disk into memory.

A second reason is that a module's in-memory image is not identical to its on-disk file image and the differences must be accounted for when comparing to a file hash. For example, address "relocations" may be applied to the in-memory image by the operating system. That is, the PE file is stored on-disk with a predefined preferred base address where the operating system (OS) loader will attempt to load the file in memory. The code in the on-disk image will be aligned with that base address. However, if there is an address collision with a module that has already been loaded at the preferred address, the OS must relocate, or "rebase", the module to a new location. When this rebasing does occur, all addresses which assumed the original preferred address within the module image need to change to reflect the base address where the PE file is actually loaded. The PE file contains relocation data which describes where these relocations must be applied. The OS loader applies the relocations to the addresses specified in the relocation data which is a data section in the on-disk PE image. Additionally, the in-memory copy of the import address table (IAT) within the loaded PE file will be modified by the OS loader as function addresses are resolved against DLL export tables. The IAT describes the in memory-address locations of functions in other PEmodules. When the PE is loaded by the OS, the IAT is changed from the original on-disk version of the PE to reflect the actual locations of functions that can be called in other PE modules outside of the PE.

There are multiple methods for performing an in-memory authentication based on a file hash. Each suffers from the inefficiencies mentioned previously. One method is to copy the entire on-disk image into memory to compute its hash, compare the hash to the stored signed hash, apply loader changes to the copy and finally compare the copy to the in-memory image which was loaded by the OS. Another method would be to back out loader changes from the in-memory image into another portion of memory, hash that memory and then compare the hash to the signed file hash. Both methods involve three basic tasks: 1) the in-memory image must be swapped into physical memory, 2) a copy of the image must be made in memory and 3) the expected differences between the in-memory image and the on-disk image caused by the operating system loader must be accounted for. These basic tasks are extremely inefficient, in terms of computation, I/O bandwidth consumption, transfer time, and memory allocation.

In order to reduce space and time requirements for loading, many current executables are created in such a way so as to obviate the need for the entire executable to be loaded by the OS in order for the program's functionality to be used. Some portion of the executable is loaded for the initial functionality, and additional portions are loaded only if and when they become necessary. For example, in one scenario, a program with a help system is executed. When the program is initially run, unneeded help system portions of the executable are not loaded. Thus, starting up the program is not delayed.

If, as described, some portions are not immediately loaded at startup, these portions may be loaded at a later time, either upon opportunity (when the loading will not cause noticeable user delay) or when additional functionality is needed. As in the example, the help system may be loaded when the user first requests use of the help system. This will reduce unnecessary use of memory in loading the help system before it is needed. However, there may be a noticeable delay to the user. Thus, alternatively, the help system may be loaded before the help system has been requested, but after the program has been started up for the user, during a time when such loading will not adversely affect the user experience unduly. In this way, while memory is used for the help system portions in advance of their use, there will be minimal delay when the user requests the help system.

However, as described, above, in order to perform in-memory authentication according to the prior art, the entire on-disk image of the PE is loaded into memory. Thus, either the advantages of delayed loading of portions of the executable can not be realized or the security of an in-memory authentication is not achieved.

In view of the foregoing, there is a need for a system that overcomes the drawbacks of the prior art.

SUMMARY OF THE INVENTION

The present invention presents an efficient technique for in-memory verification of a PE (portable executable) file.

According to one embodiment of the invention, individual "portion-level" hashes for portions of the PE file (or software module) are pre-computed and stored securely, for example in a signed hash file. Each "portion" represents a fraction of the total executable image, and separate portions may or may not represent overlapping parts of the image. In the preferred embodiment, the set of all portions does not need to cover the entire image. That is, parts of the executable that can not generally be verified do not need a verification hash. For example, these might include global data sections which are modified by the application at run-time, or data sections that were discarded once the OS loads the image like relocations data in certain OS embodiments.

Portion-level hashes are retrieved and validated as necessary, for example by validating a signature for the hash file, and then used to verify portions of the in-memory image of the executable loaded by the OS. In one embodiment, a portion-level verification proceeds by removing the changes applied to the corresponding in-memory portion of the executable before computing the hash for the portion. The computed hash can then be compared to the pre-computed hash retrieved from secure storage, and any unauthorized changes will result in a mismatch.

More generally, portion-level verification does not require the use of cryptographic hashes or signatures. Any system that can pre-compute portion-level verification information can benefit from this invention.

This portion-level verification can provide substantial performance improvement over the prior art because it allows in-memory verification of the executable without defeating working set optimizations. Moreover, it allows faster application startup because in-memory verification can be amortized over time rather than requiring an expensive monolithic verification of the entire in-memory image at startup time. Finally, parts of the executable that are not used during an execution session may never need to be verified at all.

For example, where "pages" are used as the atomic unit of memory in a system, portion-level hashes corresponding to pages of the PE file can be pre-computed. In one embodiment, an initial verification occurs for all pages that are part of the working set that have been loaded by the OS. In one embodiment, verification must occur before any of these pages is allowed to execute. In an alternate embodiment, this verification must occur before certain sensitive functions are executed. In another alternate embodiment, the verification may be amortized over time by checking subsets of pages at different times during execution. Such amortization allows the application to respond to user interaction without burdensome delays while still providing continuous tamper resistance.

In one embodiment, a select number of pages are tracked and these pages are reverified each time they are used, or, in an alternate embodiment, at least once in a given period of time. This way, continual verification of sensitive pages being used in the PE is provided.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

In order to allow in-memory authentication of a module being loaded from a persistent storage into memory, a hash is computed of at least one portion of the module. In one embodiment, the module is divided into page-size portions, and a verification technique is used which allows the page-size portions to be verified. For example, a hash is created for each of these page-size portions. The resulting hashes ("portion hashes" or "page hashes") or other verification information is stored. In one embodiment, the verification information is signed and stored on the disk with the module.

In order to perform the in-memory authentication, a portion loaded into memory is authenticated with reference to the stored verification information for that portion. For example, where a hash has been taken of each page of the module, the stored hash is compared to a computed hash of the page as loaded. In one embodiment, where the loaded page has been changed by the OS loader, the loader changes are subtracted from the page. All changes made are undone by backing out the changes to the page made by the loader. The resulting page is then hashed, creating a "check page hash". The check page hash is compared to the stored page hash. In one embodiment, before the stored page hash is used for verification, it is analyzed to determine whether it should be trusted. A signature may be checked on the stored page hash. If the signature indicates that the stored page hash can be trusted, then it is used for verification.

Module authentication is a security feature that helps protect the application execution environment against tampering. When used properly, it provides some level of protection against code patching, redirection and software breakpoints. The level of protection is dependent on the number of modules in the applications process space that are authenticated and the frequency of the authentication.

Exemplary Computing Arrangement

Figure 1:
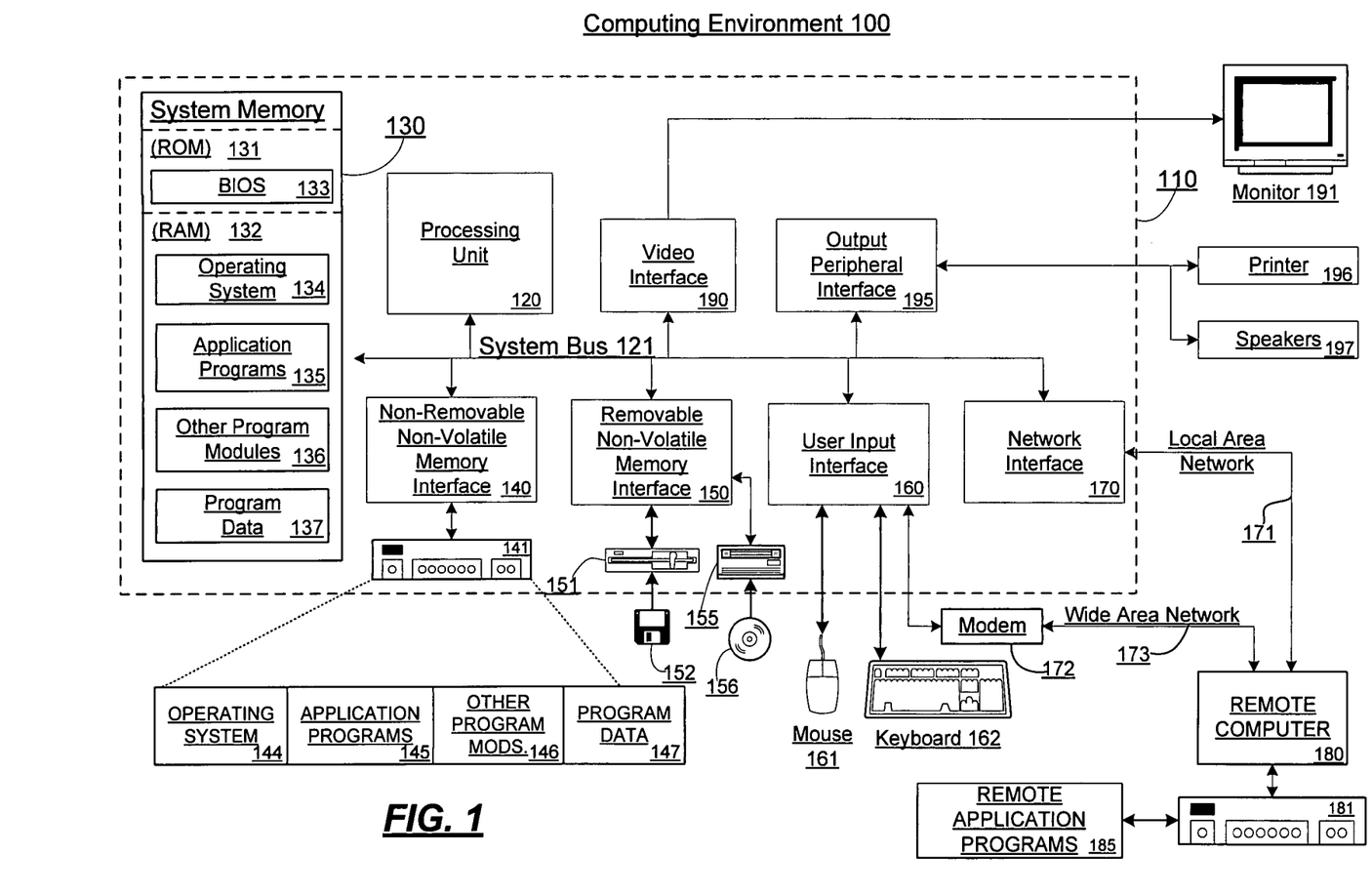
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Loading of a Software Module into Memory

Figure 2:
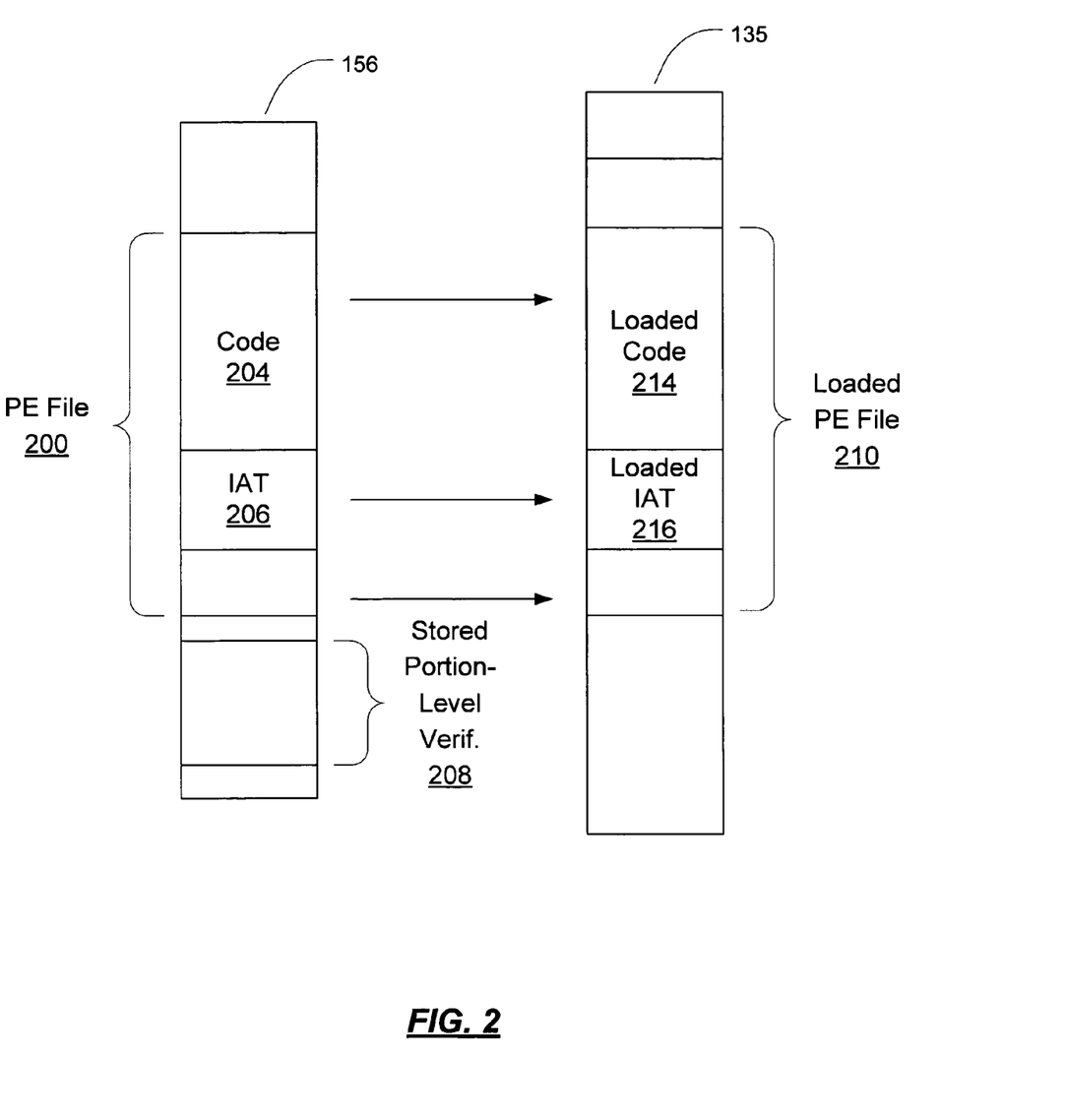
FIG. 2 is a block diagram of the loading of a software module according to one embodiment of the invention.

FIG. 2 shows how a software module such as a portable executable module may be loaded from removable/non-removable, volatile/nonvolatile computer storage media into RAM in system memory for application programs 132. By way of example only, FIG. 2 illustrates the storage media as a nonvolatile optical disk 156, such as a CD ROM, as shown in FIG. 1 and described above.

Generally, PE file 200 contains several different constituent parts. As an example, as shown in FIG. 2, the PE file 200 contains code 204 and an import address table (IAT) 206. Code 204 includes code to be executed. IAT 206 contains the structure for a table which holds the locations of functions in other modules which are called by the PE file 200 in its operation. Because these locations are not known until the PE file 200 is loaded into memory, the IAT 206 as persistently stored will be changed when the PE file 200 is loaded (as loaded IAT 216, part of loaded PE file 210) and the location of the functions in other modules are resolved. Additionally, the code 204 may contain absolute addresses which must be updated once it is loaded into memory (as loaded code 204) by the operating system.

Dynamic Verification of Portions of a Software Module

In order to dynamically verify a portion of the software module which has been loaded into RAM 132, verification information is pre-computed for the portion. The pre-computed portion level data may be or include, for example, a hash of the portion using a specific hash function. Other forms of verification are also contemplated like, for example, verification that only certain authorized function calls are made from the portion where the portion-level data is the list of the authorized functions. The pre-computed portion level verification data is then used to verify the portion of the software module which has been loaded. In one embodiment, the portion-level verifications are stored along with the PE file 200, as stored portion-level verification data 208.

One way in which the pre-computed portion-level verification data may be used to verify the loaded portion of the software module is by hashing the loaded portion of the software module, and comparing it to a stored hash (contained in the portion-level verification data). Because the OS loader may make changes to the module when loading it into the RAM 132, the loaded portion of the software module may have been changed. In such cases, hashing the loaded portion of the software module will yield a different result than a stored hash in a pre-computed portion level verification. In one embodiment, to allow the verification to continue, the changes made by the OS loader must be "backed out" of the loaded portion of the software module before the hash is computed.

For example, as discussed above, relocations may be applied to the in-memory image of the module by the operating system. If the portion of the module contains addresses requiring relocations, the in-memory image will be changed from the on-disk image of that portion. All addresses which assume the original preferred address within the module image are changed by the OS loader to reflect the base address where the PE file is actually loaded. Thus, in this embodiment, changes made to the portion are removed before the verification occurs.

Thus, in order to compute the hash and verify the portion, in one embodiment the changed addresses must revert to the original addresses. If all authorized changes are backed out, with changed information removed and returned to the original state, then the portion can be verified. This step must be careful to only reverse the process performed by the loader, because relocations may have also been tampered with by an adversary. By carefully performing only the reverse operation of the loader, tampered addresses will not be reverted to the original state and therefore will be detected by the verification as expected.

In another embodiment the portion-level verification data may include multiple variants of hashes for a given in-memory portion that can be quickly compared for verification before needing to reverse the loader changes. These variants can include anticipated variations to the loaded portion of the software module based on expected loader changes, such as relocations for common re-basing addresses.

In one embodiment, the portions being verified are pages of the software module. In this way, when the software module is paged into memory, the portions being loaded correspond to the portions which can be verified. Moreover, only the portions that have been loaded need to be verified because only those pages can be executed by the processor.

In one embodiment, each portion of the software module which is loaded is verified. As discussed below, this may be done before all or part of the software module is executed. In another embodiment, the portions of the executable are verified as they are paged into memory, for example, by integrating the verification with the OS loader via an OS driver. In another embodiment, a hot list of portions of the software module is maintained, and those portions on the hot list may be verified. In still another embodiment, portions of the software module relating to some secure functionality of the software module are verified before the secure functionality is utilized.

Because verification relies on the use of a portion-level verification data, the security of the portion-level verification data is significant. Thus, in one embodiment, as part of the verification of a portion, a check on the trustworthiness of the portion-level verification data is performed. For example, the portion-level verification data may be signed using a digital signature of a trustworthy entity. Portion-level verification data may be individually signed, or some or all of the portion-level verification data may be grouped together and signed.

Figure 3:
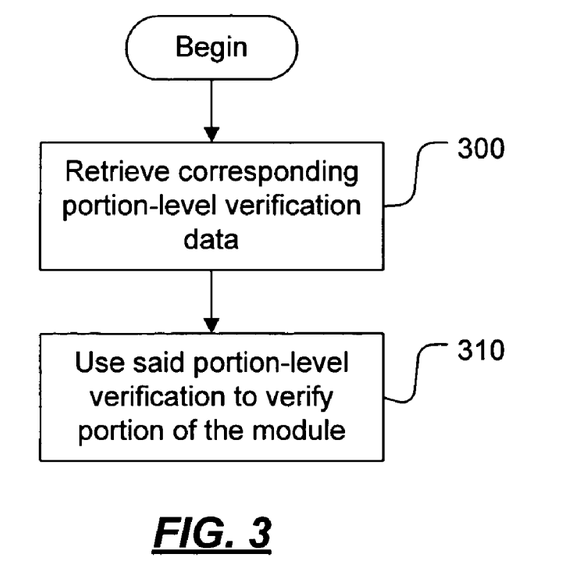
FIG. 3 is a flow diagram illustrating the process of dynamically authenticating a portion of a software module in memory according to one embodiment of the invention.

FIG. 3 is a flow diagram illustrating the process of dynamically authenticating a portion of a software module in memory. As shown in FIG. 3, first, in step 300, corresponding portion-level verification data is retrieved for the portion to be authenticated. In step 310, corresponding portion-level verification data is used to verify the portion as loaded into memory.

Scheduling of Portion-Level Verification

In one embodiment, in order for dynamic authentication to occur, the portion-level verifications occur according to a specific scheduling arrangement. Thus, where page-level hashes have been created and stored, a scheduling arrangement controls the verification of some or all of the pages in memory using the page-level hashes.

For example, according to one scheduling arrangement, where the module-level verification is followed by execution of the module, verification of the set of pages required to begin execution occurs. In one embodiment, the entire verification occurs before execution begins. In another embodiment, secure functionality of the module is contained in one or more portions of the software module. Only these portions are verified before the secure functionality is accessed. Later verifications of other portions are scheduled after execution begins.

In addition, scheduling arrangements for continual re-verifications of pages being used may also be established. For example, a hot list of specific portions of the software module may be dynamically established and maintained, and the pages listed in the hot list may be reverified continually.

As another example, a periodic verification and reverification schedule may determine how pages are reverified, in order to amortize the verification cost. Pages to verify may be selected randomly (as is common in computing systems, such random selection may be in fact pseudo-random, as computers are generally deterministic). A tunable parameter may be included which allows the costs of verification to be controlled and managed, so it does not interfere with the responsiveness of the executing software module or other modules.

Setting Up Portion-Level Verifications

Figure 4:
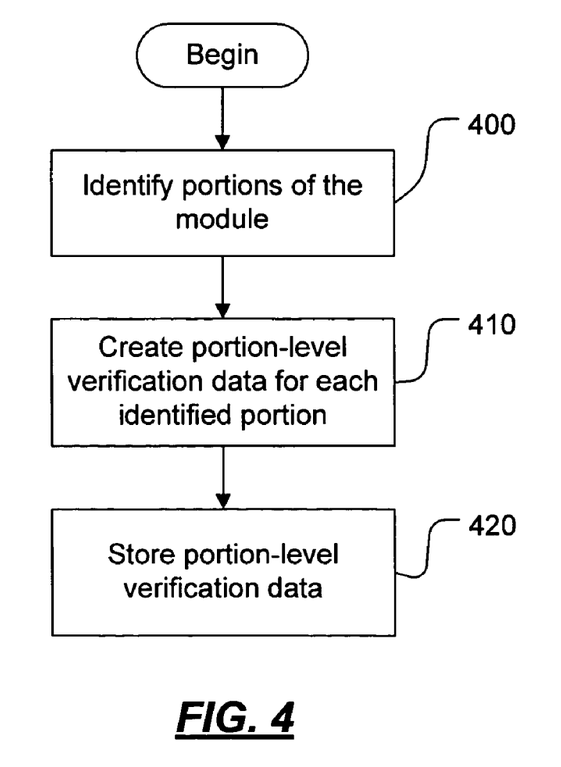
FIG. 4 is a flow diagram of a method for verifying the integrity of a software module by creating these portion-level verifications according to one embodiment of the invention

In order for portion-level verifications to be available for use in authenticating a portion of a software module in memory, they must be created. FIG. 4 is a flow diagram of a method for verifying the integrity of a software module by creating these portion-level verification data. In step 400, portions of a software module to be made verifiable are identified. In some cases, the entire module will be divided into portions, in other cases, the portions identified may overlap. In one embodiment, the portions are page-sized.

Once the portions are identified, in step 410, corresponding portion-level verification data are created for each identified portion. As described above, in one embodiment, this verification includes a hash of the identified portion. The portion-level verification data are stored in step 420. These portion-level verification data may be available along with the module, or may be made available for verification through some other means. For example, the portion-level verification data may be made available via a network, such as the Internet.

Verifier

Figure 5:
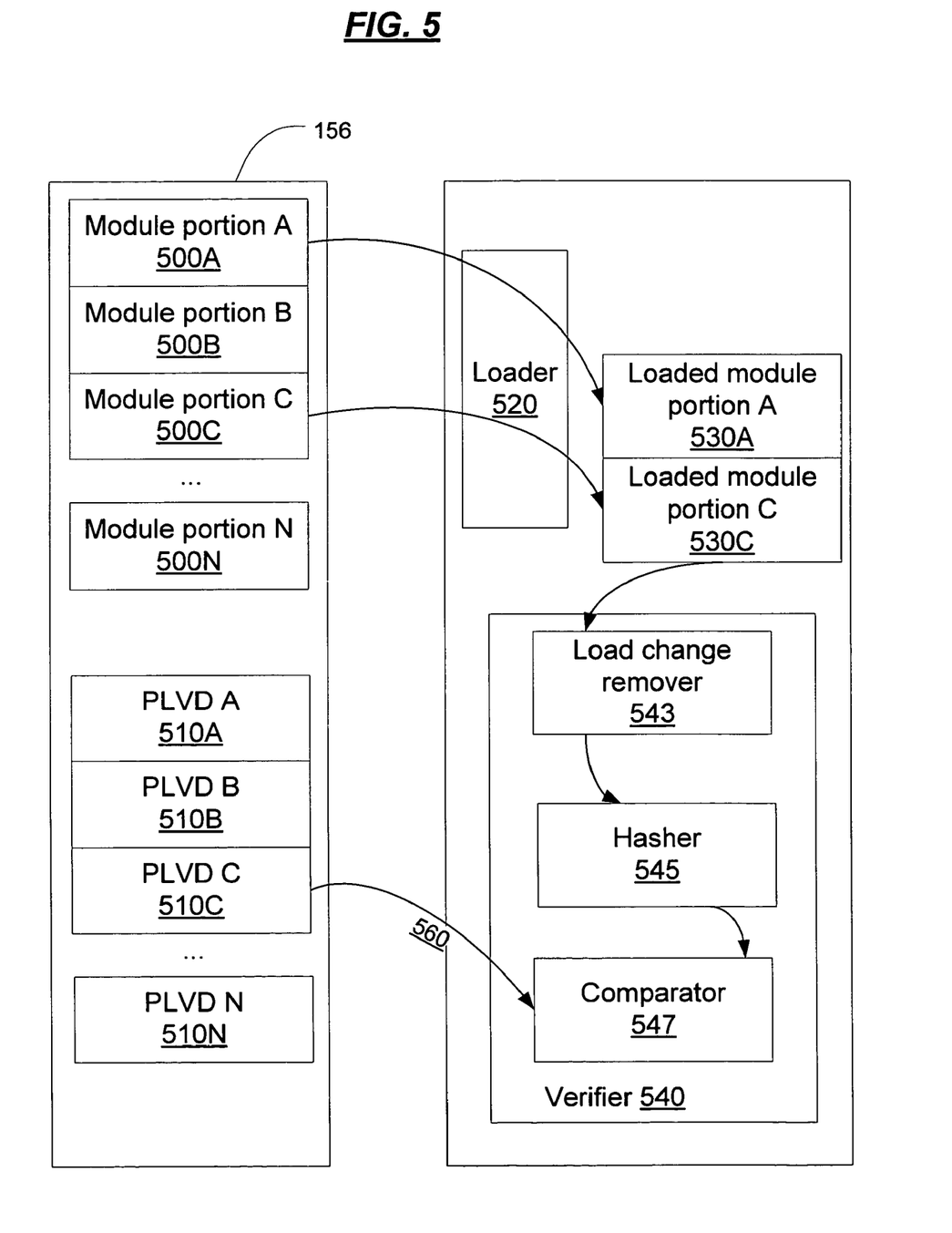
FIG. 5 is a block diagram including a module verifier using portion-level verification data.

FIG. 5 is a block diagram of a verifier according to one embodiment of the invention. The verifier contains portion-level verification data retrieval functionality. Thus, it can retrieve portion-level verification data (PLVD) from the location where it is stored. In FIG. 5, storage for PLVDs 510A through 501N is illustrated as being non-volatile optical disk 156, however, they need not be stored on a nonvolatile optical disk 156. Similarly, though module portions 500A through 500N are illustrated as being stored on the same non-volatile optical disk 156, they may be stored elsewhere, such as on a different non-volatile optical disk 156 or a different storage.

As shown in FIG. 5, computer 110 may include a loader 520. The loader 520, which may be part of the operating system, retrieves module portions 500 and creates loaded module portions 530. Additionally, computer 110 includes a verifier 540. The verifier can be used to verify that a module portion 500 as loaded (loaded module portion 530) has not been tampered with or compromised. The verifier includes portion-level verification data retrieval logic for retrieving a PLVD 510, as shown by arrow 560, corresponding to a loaded module portion 530. Additionally, the verifier 540 includes a portion level verifier for using the corresponding PLVD 510 for a loaded module portion 530 to verify that the loaded module portion 530 has not been compromised. In FIG. 5, the portion-level verifier consists of a load-change remover 543, a hasher 545, and a comparator 547. As an example, suppose module portion 500C has been loaded and is to be verified. The load change remover 543 removes the changes made to the module portion 500C when it was loaded. The load change remover 543 takes the loaded module portion 530C and removes the loader's changes.

The hasher 545 takes the loaded module portion 530C with load changes removed and hashes it according to a predetermined hash function. The result is then compared by comparator 547 to the stored PLVD 510C as retrieved. If the result of the hash of the loaded module portion 530C with changes removed is equal to the stored PLVD 510C, then the loaded module portion 530C is verified. Otherwise, loaded module portion 530C is suspect.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of verifying the integrity of a software module, comprising:
    accessing a software module to be executed, said software module comprising a plurality of specific verifiable portions, and portion-level verification data corresponding to each of the specific verifiable portions, wherein said portion-level verification data is pre-computed and pre-stored in association with said software module and said portion level verification data comprises a plurality of hashes of said specific portion, each of said plurality of hashes being based on an anticipated change to a loaded portion of said software module;
    loading into memory a subset of specific verifiable portions from among the plurality of specific verifiable portions of the software module, wherein verification of said subset is required to begin execution of the software module;
    retrieving corresponding portion-level verification data for each specific verifiable portion in the subset
    using said corresponding portion-level verification data to verify each specific verifiable portion in the subset of said software module as loaded into memory;
    executing, when said subset is verified, a specific verifiable portion of the software module loaded in memory which has not been verified;
    modifying at least one specific verifiable portion to reverse any loading changes implemented by a loader in loading said specific verifiable portion;
    hashing said modified specific verifiable portion; and comparing the result of said hash of said modified specific verifiable portion to said corresponding portion-level verification data.

2. The method of claim 1, where said each specific verifiable portion is a page.

3. The method of claim 1, further comprising:
    maintaining a hot list of specific verifiable portions of said software module which have been loaded into said memory; and
    verifying each portion on said hot list using corresponding portion level verification data.

4. The method of claim 1, where said subset of specific verifiable portions corresponds to at least one secure portion of said software module related to secure functionality which must be verified before said secure functionality is utilized.

5. The method of claim 1, where said step of using said corresponding portion-level verification data further comprises:
    using a digital signature of said corresponding portion-level verification data to determine that said corresponding portion-level verification data is trustworthy.

6. The method of claim 1, further comprising:
    periodically verifying at least one specific verifiable portion from among at least two specific verifiable portions of said software module loaded in memory.

7. The method of claim 6, where said periodic verification occurs at a randomly chosen time.

8. The method of claim 6, where said periodic verification occurs according to a tunable parameter.

9. The method of claim 6, where said periodic verification is scheduled based on a factor selected from among the following: inclusion of said specific verifiable portion on a hot list; the time elapsed since said specific verifiable portion was last verified; and whether said specific verifiable portion had previously been verified.

10. At least one of an operating system, a computer readable storage medium having stored thereon a plurality of computer-executable instructions, a co-processing device, and a computing device, having computer executable instructions for performing the method of claim 1.

11. A computing system, comprising:
    a processor unit; and
    a memory system having stored therein (i) a software module comprising a plurality of specific verifiable portions, and portion-level verification data corresponding to each of the specific verifiable portions, wherein said portion-level verification data is pre-computed and pre-stored in association with said software module, and (ii) program instructions that are executable by the processor unit to perform acts for verifying the integrity of the software module, the acts comprising:
        loading into memory a subset of specific verifiable portions from among the plurality of specific verifiable portions of the software module, wherein verification of said subset is required to begin execution of the software module and portion level verification data comprises a plurality of hashes of said specific portion, each of said plurality of hashes being based on an anticipated change to a loaded portion of said software module;
        retrieving corresponding portion-level verification data for each specific verifiable portion in the subset;
        using said corresponding portion-level verification data to verify each specific verifiable portion in the subset of said software module as loaded into memory; and
        executing, when said subset is verified, a specific verifiable portion of the software module loaded in memory which has not been verified;
        modifying at least one specific verifiable portion to reverse any loading changes implemented by a loader in loading said specific verifiable portion;
        hashing said modified specific verifiable portion; and
        comparing the result of said hash of said modified specific verifiable portion to said corresponding portion-level verification data.

12. The system of claim 11, where each specific verifiable portion is a page.

13. The system of claim 11, further comprising program instructions that are executable by the processor unit for:
  maintaining a hot list of specific verifiable portions of said software module which have been loaded into said memory; and
  verifying each portion on said hot list using corresponding portion level verification data.

14. The system of claim 11, where said subset of specific verifiable portions corresponds to at least one secure portion of said software module related to secure functionality which must be verified before said secure functionality is utilized.

15. The system of claim 11, further comprising program instructions that are executable by the processor unit for using a digital signature of said corresponding portion-level verification data to determine that said corresponding portion-level verification data is trustworthy.

16. The system of claim 11, further comprising program instructions that are executable by the processor unit for periodically verifying at least one specific verifiable portion from among at least two specific verifiable portions of said software module loaded in memory.

17. The system of claim 16, where said periodic verification occurs at a randomly chosen time.

18. The system of claim 16, where said periodic verification occurs according to a tunable parameter.

19. The system of claim 16, where said periodic verification is scheduled based on a factor selected from among the following: inclusion of said specific verifiable portion on a hot list; the time elapsed since said specific verifiable portion was last verified; and whether said specific verifiable portion had previously been verified.

20. The system of claim 11, wherein said corresponding portion-level verification data for at least one specific verifiable portion of said software module comprises a plurality of hashes, each of said plurality of hashes being based on an anticipated variation of said specific verifiable portion of said software module.

21. The method of claim 11, wherein said software module comprises one or more non-verifiable portions for which no portion-level verification data is pre-computed and pre-stored in association with said one or more non-verifiable portions of said software module.

22. The method of claim 1, wherein at least two of said specific verifiable portions of said software module have overlapping portions.

23. The system of claim 11, wherein said software module comprises one or more non-verifiable portions for which no portion-level verification data is pre-computed and pre-stored in association with said one or more non-verifiable portions of said software module.

24. The system of claim 11, wherein at least two of said specific verifiable portions of said software module have overlapping portions.

* * * * *